United States Patent
Vajo et al.

(10) Patent No.: US 11,050,075 B1
(45) Date of Patent: Jun. 29, 2021

(54) HYDROGEN STORAGE MATERIALS CONTAINING LIQUID ELECTROLYTES

(71) Applicant: HRL Laboratories, LLC, Malibu, CA (US)

(72) Inventors: John J. Vajo, West Hills, CA (US);
Jason A. Graetz, Calabasas, CA (US);
Channing Ahn, Pasadena, CA (US);
Dan Addison, Los Angeles, CA (US);
Hongjin Tan, Monterey Park, CA (US);
Jasim Uddin, Santa Clarita, CA (US)

(73) Assignee: HRL Laboratories, LLC, Malibu, CA (US)

(*) Notice: Subject to any disclaimer, the term of this patent is extended or adjusted under 35 U.S.C. 154(b) by 276 days.

(21) Appl. No.: 15/928,194

(22) Filed: Mar. 22, 2018

Related U.S. Application Data

(60) Provisional application No. 62/514,602, filed on Jun. 2, 2017.

(51) Int. Cl.
*C01B 3/00* (2006.01)
*H01M 8/14* (2006.01)
(52) U.S. Cl.
CPC .................................. *H01M 8/143* (2013.01)
(58) Field of Classification Search
None
See application file for complete search history.

(56) References Cited

U.S. PATENT DOCUMENTS

| | | | |
|---|---|---|---|
| 6,365,301 B1* | 4/2002 | Michot | H01M 4/602 429/307 |
| 8,764,966 B2 | 7/2014 | Vajo et al. | |
| 2006/0041175 A1* | 2/2006 | Thorn | C07D 235/18 570/123 |
| 2007/0025908 A1* | 2/2007 | Sandrock | C01B 3/0026 423/644 |

(Continued)

OTHER PUBLICATIONS

Paskevicius et al., "Kinetic limitations in the Mg-Si-H system" International Journal of Hydrogen Energy 36 (2011) 10779-10786.

(Continued)

*Primary Examiner* — Lucas J. O'Donnell
(74) *Attorney, Agent, or Firm* — O'Connor & Company

(57) ABSTRACT

In some variations, a hydrogen-storage material formulation comprises: a solid hydrogen-storage material containing at least one metal and hydrogen that is bonded with the metal; and a liquid electrolyte that is ionically conductive for at least one ion derived from the hydrogen-storage material. The liquid electrolyte may be from 5 wt % to about 20 wt % of the hydrogen-storage material formulation, for example. Many materials are possible for both the hydrogen-storage material as well as the liquid electrolyte. The hydrogen-storage material has a higher hydrogen evolution rate in the presence of the liquid electrolyte compared to a hydrogen-storage material without the liquid electrolyte. This is experimentally demonstrated with a destabilized metal hydride, $MgH_2/Si$ system, incorporating a LiI—KI—CsI ternary eutectic salt as the liquid electrolyte. Inclusion of the liquid electrolyte gives a ten-fold increase in $H_2$ evolution rate at 250° C., reaching 3.5 wt % hydrogen released in only 7 hours.

26 Claims, 4 Drawing Sheets

(56) References Cited

U.S. PATENT DOCUMENTS

2013/0266878 A1\* 10/2013 Vajo et al.
2013/0330270 A1\* 12/2013 Yang .................... C01B 3/0026
423/658.2
2014/0262813 A1\* 9/2014 Vajo ................. H01M 8/04216
205/512

OTHER PUBLICATIONS

Zheng et al., "Dehydrogenation of LiAlH4 in HMPA" International Journal of Hydrogen Energy 33 (2008)3346-3350.
Zhang et al., "Understanding the effect of titanium species on the decomposition of alanates in homogeneous solution" Journal of Alloys and Compounds 413 (2006) 218-221.
Klebanoff et al., "5 Years of hydrogen storage research in the U.S. DOE Metal Hydride Center of Excellence (MHCoE)" International Journal of Hydrogen Energy 38 (2013) 4533-4576.
Vajo et al., Altering Hydrogen Storage Properties by Hydride Destabilization through Alloy Formation: LiH and MgH2 Destabilized with Si J. Phys. Chem. B 2004, 108, 13977-13983.
Ley et al., "Complex hydrides for hydrogen storage—new perspectives" Materials Today, vol. 17, No. 3, Apr. 2014, 122-128.
Polanski et al., "The influence of different additives on the solid-state reaction of magnesium hydride (MgH2) with Si" International Journal of Hydrogen Energy 34 (2009) 7692-7699.
Singh et al., "A high energy-density tin anode for rechargeable magnesium-ion batteries" Chem. Commun., 2013, 49, 149.
Chaudhary et al., "Mg2Si Nanoparticle Synthesis for High Pressure Hydrogenation" J. Phys. Chem. C 2014, 118, 1240-1247.
Vajo et al., "Electrolyte-Assisted Hydrogen Storage Reactions" J. Phys. Chem. C 2018, 122, 26845-26850.

\* cited by examiner

HYDROGEN STORAGE MATERIALS CONTAINING LIQUID ELECTROLYTES

PRIORITY DATA

This patent application is a non-provisional application with priority to U.S. Provisional Patent App. No. 62/514,602, filed on Jun. 2, 2017, which is hereby incorporated by reference herein.

STATEMENT REGARDING FEDERALLY SPONSORED RESEARCH OR DEVELOPMENT

This invention was made with Government support under Contract No. DE-EE0007849. The Government has certain rights in this invention.

FIELD OF THE INVENTION

The present invention generally relates to hydrogen-storage material formulations and systems.

BACKGROUND OF THE INVENTION

Hydrogen has a number of commercial uses. Hydrogen may be converted to energy by combustion, in the form of heat or motion (kinetic energy). Motion in an engine may propel an automobile, for example, while motion in a turbine may generate electricity. Hydrogen may also be utilized to absorb or release heat, in thermal energy storage. Hydrogen pressure may also be increased or decreased to cause actuation for moving or controlling a mechanism or system.

Currently, hydrogen gas for fuel cell applications is supplied from devices that store hydrogen in ways that can be divided approximately into the following categories: 1) as compressed hydrogen gas; 2) as cryogenic liquid hydrogen; 3) as hydrogen atoms at low density in metallically bonded transition metal hydrides; 4) as hydrogen atoms at high density in ionically bonded light metal hydrides; 5) as hydrogen atoms at high density in polar covalently bonded complex hydrides; 6) as multiple-phase mixtures of categories 3, 4, and 5; or 6) as hydrogen molecules adsorbed on high surface area supports. Each of these methods has shortcomings.

Storage of hydrogen as a compressed gas requires high pressures, approaching 700 atmospheres, in order to achieve acceptable storage densities. These pressures require significant energy for compression while also imposing engineering and safety challenges.

Liquefaction of hydrogen consumes 30% of the energy content of the hydrogen. Liquid hydrogen, at a temperature of 23 K, is also difficult to maintain over extended times without significant loss due to boil-off.

Transition metals store hydrogen as chemically bonded hydrogen atoms and, therefore, input of energy is needed to release the hydrogen. This energy is introduced in the form of heat to achieve elevated temperatures. The required temperatures are moderate because of the relatively weak metallic bonding that exists in transition metal hydrides. However, transition metal atoms have atomic weights of greater than approximately 50 atomic mass units and store at most approximately two hydrogen atoms per transition metal atom. Thus, the gravimetric storage density of transition metal hydrides is less than 4 weight percent hydrogen (4 wt %), which is too low for many applications.

Light metal atom hydrides can have high hydrogen densities, up to approximately 12 weight percent hydrogen. However, the ionic chemical bonds between the metal and the hydrogen in these hydrides are very strong and, therefore, very high thermodynamic temperatures, such as from about 300-900° C. or more are needed to release the hydrogen. These temperatures are impractical for many applications.

Hydrogen stored in polar covalently bonded light metal complex hydrides can have storage densities up to 18 weight percent hydrogen. Like light metal hydrides, these compounds are generally very strongly bound and therefore high temperatures are required to release the hydrogen.

Mixtures that may contain transition metal hydrides, light atom metal hydrides, or polar covalently bonded light metal complex hydrides can also have high storage densities with thermodynamics that can be tuned through the composition of the mixture. While possibly having favorable thermodynamic properties, these hydride mixtures typically have very slow rates of hydrogen exchange, in part because multiple phases require reaction across phase boundaries as well as nucleation and growth of new solid phases.

Hydrogen molecules, when adsorbed on high-surface-area supports, are weakly bound. As a result, at moderately high pressures, for example at approximately 100 atmospheres, cryogenic temperatures (typically 77 K, which is the temperature of liquid nitrogen) are needed to achieve high storage densities.

Proton exchange membrane fuel cells are being currently developed as power sources for a variety of military, transportation, and electronic device applications. To be viable, these fuel cells require high density and energy efficient storage of hydrogen. Improved material formulations are required to more efficiently store and provide hydrogen gas for these and other commercial applications. In general, there is a desire for reversible metal hydrides with sufficient dehydrogenation and hydrogenation kinetics at practical temperatures and pressures.

SUMMARY OF THE INVENTION

In some variations, the invention provides a hydrogen-storage material formulation comprising:

(a) a solid hydrogen-storage material containing at least one metal and hydrogen that is bonded ionically, covalently, and/or interstitially within the hydrogen-storage material; and (b) a liquid electrolyte that is ionically conductive for at least one ion derived from the hydrogen-storage material.

The hydrogen may be bonded ionically, covalently, and/or interstitially with at least one metal contained in the hydrogen-storage material. Alternatively, or additionally, the hydrogen may be bonded ionically and/or covalently with a metalloid (e.g., boron) that is also contained within the hydrogen-storage material.

In some embodiments, the liquid electrolyte is present in a liquid electrolyte concentration from about 1 wt % to about 50 wt % of the hydrogen-storage material formulation. The liquid electrolyte concentration is preferably less than 20 wt %.

The liquid electrolyte enhances the rate of hydrogen evolution (release as $H_2$ during dehydrogenation), as described below in detail. The hydrogen-storage material may be characterized by a higher hydrogen evolution rate in the presence of the liquid electrolyte compared to an otherwise-equivalent hydrogen-storage material formulation without the liquid electrolyte.

The hydrogen-storage material may be selected from the group consisting of complex metal hydrides, destabilized metal hydrides, metal borohydrides, and combinations thereof, for example. In certain embodiments, the hydrogen-storage material is selected from the group consisting of $MgH_2$, $Mg(BH_4)_2$, $LiH$, $LiBH_4$, $LiAlH_4$, $KBH_4$, $NaAlH_4$, and combinations thereof.

The hydrogen-storage material typically contains at least 1 wt % hydrogen, preferably at least 3 wt % hydrogen, more preferably at least 5 wt % hydrogen, and most preferably at least 10 wt % hydrogen.

The liquid electrolyte preferably has an ionic conductivity at 25° C. of at least $10^{-6}$ S/cm for at least one ion derived from the hydrogen-storage material. Preferably, the liquid electrolyte has an ionic conductivity at 25° C. of at least $10^{-3}$ S/cm for at least one ion derived from the hydrogen-storage material.

The liquid electrolyte is preferably not reactive with the hydrogen-storage material. Also, the liquid electrolyte is preferably not reactive with hydrogen gas.

The liquid electrolyte may be an organic liquid electrolyte, an inorganic liquid electrolyte, or a non-aqueous liquid electrolyte, for example. In some embodiments, the electrolyte comprises a solvent and one or more dissolved salts.

In some embodiments, the liquid electrolyte comprises a molten salt. In certain embodiments, a molten salt is or includes one or more halogenated alkali metals, such as (but not limited to) LiI, KI, CsI, or a combination thereof (e.g., LiI—KI—CsI ternary eutectic salt). When the liquid electrolyte includes a molten salt, the liquid electrolyte may further comprise one or more additional dissolved salts.

In some embodiments, the liquid electrolyte is ionically conductive for one or more alkali cations or alkaline earth cations. For example, the liquid electrolyte may be ionically conductive for one or more cations selected from the group consisting of $Li^+$, $Mg^{2+}$, $Na^+$, $K^+$, and $Ca^{2+}$. In these or other embodiments, the liquid electrolyte is ionically conductive for one or more anions selected from the group consisting of $H^-$, $BH_4^-$, $AlH_4^-$, and $(AlH_6)^{3-}$, or other hydrogen-containing anions.

The liquid electrolyte may be capable of dissolving a metal oxide derived from the hydrogen-storage material, such as when the liquid electrolyte contains halogen anions (e.g., $Cl^-$, $Br^-$, and/or $I^-$). Also, the liquid electrolyte may further be capable of dissolving an elemental hydride (e.g., $MgH_2$ or LiH) derived from the hydrogen-storage material.

Other variations of the invention provide a reversible hydrogen-storage material system, the system comprising:

(a) a solid hydrogen-storage material; and (b) a liquid electrolyte that is ionically conductive for at least one ion derived from the hydrogen-storage material, wherein the hydrogen-storage material, in a first state, contains at least one metal and hydrogen that is bonded ionically, covalently, and/or interstitially within the hydrogen-storage material, and wherein the hydrogen-storage material, in a second state, contains a dehydrogenated form of the hydrogen-storage material.

The reversible hydrogen-storage material system is capable of at least 1 dehydrogenation-hydrogenation cycle, and preferably at least 10 dehydrogenation-hydrogenation cycles. The reversible hydrogen-storage material system may be operable at a temperature from about 0° C. to about 300° C., and at a pressure from about 0.01 atm to about 100 atm.

In the reversible hydrogen-storage material system, the liquid electrolyte may be present in a liquid electrolyte concentration from about 1 wt % to about 50 wt % on the basis of combined weight of the hydrogen-storage material and the liquid electrolyte.

The hydrogen-storage material may be selected from the group consisting of complex metal hydrides, destabilized metal hydrides, metal borohydrides, and combinations thereof. The hydrogen-storage material preferably contains at least 3 wt % hydrogen.

In some embodiments, the liquid electrolyte is ionically conductive for one or more alkali cations or alkaline earth cations. In these or other embodiments, the liquid electrolyte is ionically conductive for one or more hydrogen-containing anions.

In certain embodiments, the liquid electrolyte is capable of dissolving an elemental hydride and/or a metal oxide derived from the hydrogen-storage material.

The present invention also provides a method of reversible hydrogen storage, the method comprising operating the disclosed reversible hydrogen-storage material system to dehydrogenate and then hydrogenate the hydrogen-storage material in at least 1 dehydrogenation-hydrogenation cycle.

DETAILED DESCRIPTION OF EMBODIMENTS OF THE INVENTION

Figure 1:
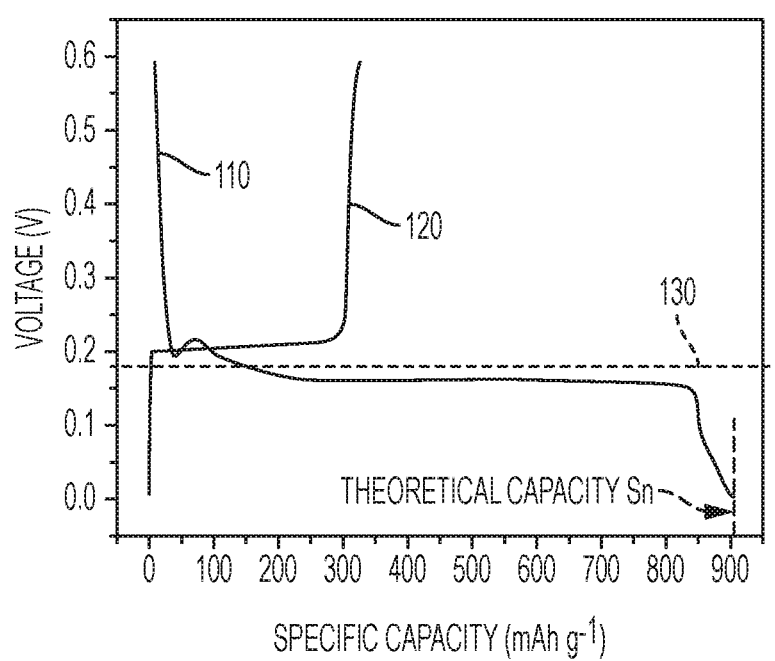
FIG. 1 is a plot of voltage is versus specific capacity for a Mg (anode)+Sn (cathode) battery with a liquid electrolyte at room temperature.

The systems, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the present invention are premised on formulations of hydrogen-storage materials that include liquid electrolytes. The liquid electrolytes facilitate hydrogen exchange in hydrogen-storage materials by improving the kinetics, i.e., increasing the reaction rates and/or mass-transfer rates at which hydrogen can be (1) released from a hydrogen-storage material and/or (2) inserted into a hydrogen-storage material.

Without being limited to any particular theory, it is believed that the kinetics are improved because the diffusion is greatly enhanced in liquid phases; liquid phases can wet solid phases with maximum interfacial contact, unlike solid phases which have limited solid-solid interfacial contact; and liquid electrolytes can function as fluxes, removing passivating surface layers. By facilitating the hydrogenation/dehydrogenation kinetics, the inclusion of liquid electrolytes makes high-hydrogen-density hydrogen-storage materials practical. Heretofore, such high-hydrogen-density hydrogen-storage materials were impractical due to unacceptably slow rates of hydrogen exchange.

Variations of this invention apply to portable power (e.g., consumer electronic devices), fuel cell-based transportation technologies, and low-signature power, among others. As stated in the Background, practical fuel cells require high hydrogen density and energy-efficient storage of that hydrogen. Variations of this invention provide a metal hydride-based thermal energy storage system which may be used for electric vehicle heating and cooling, for example.

In general, compared to conventional technologies for storing hydrogen, variations of this invention provide material formulations with higher hydrogen-density storage and with hydrogen release at higher energy efficiency. In particular, some embodiments employ hydrogen-storage materials that operate at lower pressures than current compressed-hydrogen vessels, thereby eliminating the need for cryogenic cooling required for liquid hydrogen storage.

In some variations, the invention provides a hydrogen-storage material formulation comprising:

(a) a solid hydrogen-storage material containing at least one metal and hydrogen that is bonded ionically, covalently, and/or interstitially within the hydrogen-storage material; and (b) a liquid electrolyte that is ionically conductive for at least one ion derived from the hydrogen-storage material.

The hydrogen may be bonded ionically, covalently, and/or interstitially with at least one metal contained in the hydrogen-storage material. Alternatively, or additionally, the hydrogen may be bonded ionically and/or covalently with a metalloid that is also contained within the hydrogen-storage material.

A "metalloid" means a chemical element which has properties in between those of metals and nonmetals. Exemplary metalloids are boron, silicon, germanium, arsenic, antimony, and tellurium. In some embodiments, the hydrogen-storage material includes a borohydride metal salt, in which hydrogen is bonded directly to boron in the species $BH_4^-$, which itself is bonded ionically to a metal. The hydrogen atoms are therefore not directly bonded to the metal, in the case of metal borohydrides.

The hydrogen-storage material typically contains at least 1 wt % hydrogen, preferably at least 3 wt % hydrogen, more preferably at least 5 wt % hydrogen, and most preferably at least 10 wt % hydrogen.

In some embodiments, the liquid electrolyte is present in a liquid electrolyte concentration from about 1 wt % to about 50 wt % of the hydrogen-storage material formulation. The liquid electrolyte concentration is preferably less than 20 wt %.

As intended herein, an "electrolyte" is a material that conducts ions. An electrolyte that is contained in a hydrogen-storage material formulation, as disclosed herein, conducts at least one ion derived from the hydrogen-storage material, at a desired operation temperature. "Operation" refers to dehydrogenation of the hydrogen-storage material, and optionally hydrogenation. An operation temperature is generally one or more temperatures in the range of 0° C. to 300° C.

The ion derived from the hydrogen-storage material may be a cation or an anion, or a combination of ions may be derived from the hydrogen-storage material and ionically conducted within the electrolyte.

The electrolyte is characterized by an ionic conductivity of about, or at least about, $10^{-9}$ S/cm, $10^{-8}$ S/cm, $10^{-7}$ S/cm, $10^{-6}$ S/cm, $10^{-5}$ S/cm, $10^{-4}$ S/cm, $10^{-3}$ S/cm, $10^{-2}$ S/cm, $10^{-1}$ S/cm, or 1 S/cm, as measured at 25° C., for the at least one ion derived from the hydrogen-storage material. In some embodiments, the electrolyte is characterized by an ionic conductivity of about, or at least about, $10^{-9}$ S/cm, $10^{-8}$ S/cm, $10^{-7}$ S/cm, $10^{-6}$ S/cm, $10^{-5}$ S/cm, $10^{-4}$ S/cm, $10^{-3}$ S/cm, $10^{-2}$ S/cm, $10^{-1}$ S/cm, or 1 S/cm, as measured at a particular operation temperature that is in the range of 0° C. to 300° C. The liquid electrolyte preferably has an ionic conductivity of at least $10^{-6}$ S/cm, more preferably at least $10^{-3}$ S/cm, for at least one ion derived from the hydrogen-storage material, at 25° C. and/or at an operation temperature. Here, the operation temperature may be about 0° C., 25° C., 50° C., 75° C., 100° C., 125° C., 150° C., 175° C., 200° C., 225° C., 250° C., 275° C., or 300° C., or a combination of temperatures, for example.

As intended herein, a "liquid electrolyte" is an electrolyte with a melting point that is at or below 300° C., at a pressure of 1 atm. That is, a liquid electrolyte is in a liquid phase at relatively low temperatures (at or below 300° C.). This is in contrast to high-melting-point solid electrolytes, such as solid salts. For example, sodium chloride melts at about 800° C. and would not itself be classified herein as a liquid electrolyte.

In various embodiments, the selected liquid electrolyte has a melting point of about −100° C., −75° C., −50° C., −25° C., 0° C., 25° C., 50° C., 75° C., 100° C., 125° C., 150° C., 175° C., 200° C., 225° C., 250° C., 275° C., or 300° C., all as measured at atmospheric pressure. Note that when the selected liquid electrolyte has a melting point above room temperature (e.g., about 20° C.), the liquid electrolyte may initially be in solid form when in the hydrogen-storage material formulation. Even in this solid form, the electrolyte is still classified as a liquid electrolyte as long as it meets the definition above. During operation, such as at 200° C., the liquid electrolyte, if it is initially in solid form, will melt into a liquid phase within the hydrogen-storage material formulation.

There needs to be at least one liquid phase of the electrolyte at the operation temperature, according to the principles of the invention set forth herein. Therefore, the operation temperature is preferably at least equal to, or greater than, the melting point of the liquid electrolyte. In some cases, the operation temperature should be at least equal to, or greater than, the liquefaction point of the liquid electrolyte in a multicomponent system. That is, multicomponent systems can alter single-component melting points, and the liquid electrolyte liquefaction point may be lower or higher than the liquid electrolyte melting point. The requirement is that the liquid electrolyte at least partially liquefies during operation, or is already a liquid. Some amount of a vapor phase may form or be present at an operation temperature, depending on the vapor pressure of the liquid electrolyte. Multiple liquid phases may also be present in the hydrogen-storage material formulation, wherein the multiple liquid phases may or may not each contain liquid electrolyte.

The liquid electrolyte is preferably not reactive with the solid hydrogen-storage material. That is, at operation temperatures (such as from 0-300° C.), the liquid electrolyte is inert with respect to the hydrogen-storage material and does not directly react with it to release hydrogen. For example, water as a solvent will react with a complex hydride such as $LiBH_4$, undergoing hydrolysis to release $H_2$. Water in this system is a reactant, and is not an inert liquid electrolyte, as is required in preferred embodiments of the invention. Organic electrolytes can also be reactive with solid hydrogen-storage materials, leading to precipitation, decomposition, or other various reactions. Preferred organic liquid electrolytes of this invention are inert with respect to the hydrogen-storage material.

Also, the liquid electrolyte is preferably not reactive with $H_2$ being released from, or absorbed into, the hydrogen-storage material. That is, at operation temperatures (such as from 0-300° C.), the liquid electrolyte is inert with respect to hydrogen gas and does not directly react with it.

In some embodiments, the liquid electrolyte is a molten salt. The molten salt as employed herein has a melting point of 300° C. or less, such as about 200° C. or less, or about 100° C. or less. As stated above, the melting point of the molten salt needs to be no greater than the operation temperature. This ensures that during operation, at least some of the molten salt is in a liquid phase.

Inorganic molten salts may be thermally stable over a wide temperature range for dehydrogenation and may be formulated with components that are chemically inert to hydrogen-storage compounds.

In certain embodiments, a molten salt is or includes one or more halogenated alkali metals, such as (but not limited to) LiI, KI, CsI, or a combination thereof. An exemplary molten salt is a LiI—KI—CsI ternary eutectic salt with equimolar (1:1:1) composition that melts at about 200-210° C.

When the liquid electrolyte includes a molten salt, the liquid electrolyte may further comprise one or more additional dissolved salts. These additional dissolved salts need not have melting points of 300° C. or less.

The liquid electrolyte may be an organic liquid electrolyte or an inorganic liquid electrolyte. The liquid electrolyte is typically a non-aqueous liquid electrolyte. In certain embodiments, the liquid electrolyte is an aqueous liquid electrolyte, or is a substantially non-aqueous liquid electrolyte with traces of water present.

In some embodiments, the liquid electrolyte comprises a solvent and one or more dissolved salts. The solvent (dissolving phase) may itself be ionically conductive, but the solvent need not be, as long as the dissolved salts provided the required ionic conductivity.

In various embodiments, the liquid electrolyte may contain organic carbonates, such as (but not limited to) ethylene carbonate and propylene carbonate.

In various embodiments, the liquid electrolyte may contain ethers, such as glycol ethers. For example, the liquid electrolyte may contain dimethoxyethane, bis(2-methoxyethyl) ether, triethylene glycol dimethyl ether, tetraethylene glycol dimethyl ether, or a combination thereof.

In various embodiments, the liquid electrolyte may contain eutectic molten salts, which may be binary eutectics, ternary eutectics, quaternary eutectic, or higher eutectics.

In some embodiments, the liquid electrolyte may contain Grignards, such as (but not limited to) alkyl-, vinyl-, or aryl-magnesium halides or other alkaline earth halides.

In various embodiments, the liquid electrolyte may contain hexamethylphosphoramide (HMPA), dimethylsulfoxide (DMSO), N,N,-dimethylacetamide (DMA), trimethylphosphate (TMP), triethylphosphate (TEP), N-methylacetamide (NMA), diethylphosphate (DEP), tetramethylurea (TMU), or a combination thereof.

A non-aqueous electrolyte may be chosen from a variety of inorganic salts with a suitable solvent. For example, inorganic salts such as LiCl, LiBr, LiI, $MgCl_2$, $MgBr_2$, or $MgI_2$ may be employed. Suitable solvents for dissolving the inorganic salts may be selected from the group consisting of dimethyl sulfoxide, sulfolane, ethylene carbonate, propylene carbonate, dimethyl carbonate, diethyl carbonate, methyl ethyl carbonate, 1,2-dimethoxyethane, 1,2-diethoxyethane, γ-buterolactone, γ-valerolactone, 1,3-dioxolane, tetrahydrofuran, 2-methyltetrahydrofuran, acetonitrile, proprionitrile, diglyme, triglyme, methyl formate, trimethyl phosphate, triethyl phosphate, and mixtures thereof, for example. Preferably, the inorganic salt has a solubility of at least about 0.1 moles of salt dissolved per liter of solvent.

In some embodiments, the liquid electrolyte is ionically conductive for one or more alkali cations or alkaline earth cations. For example, the liquid electrolyte may be ionically conductive for one or more cations selected from the group consisting of $Li^+$, $Mg^{2+}$, $Na^+$, $K^+$, and $Ca^{2+}$. In these or other embodiments, the liquid electrolyte is ionically conductive for one or more anions selected from the group consisting of $H^-$, $BH_4^-$, $AlH_4^-$, and $(AlH_6)^{3-}$, or other hydrogen-containing anions.

The liquid electrolyte may be capable of dissolving a metal oxide derived from the hydrogen-storage material, such as when the liquid electrolyte contains halogen anions (e.g., $Cl^-$, $Br^-$, and/or $I^-$). Also, the liquid electrolyte may further be capable of dissolving an elemental hydride (e.g., $MgH_2$ or LiH) derived from the hydrogen-storage material.

The liquid electrolyte may be selected according to various criteria. In some embodiments, the liquid electrolyte is selected for redox stability at the desired operation temperature. In some embodiments, the liquid electrolyte is selected for its vapor pressure at the desired operation temperature. The vapor pressure of the liquid electrolyte is preferably low enough to permit recovery of pure or relatively pure hydrogen at the desired operation temperature. In some embodiments, the liquid electrolyte is selected for its hydrogen gas exchange and transport. In particular, the liquid electrolyte preferably does not limit hydrogen availability. Finally, in some embodiments, the liquid electrolyte is selected for its weight and/or volume in the overall formulation. The amount of liquid electrolyte preferably does not severely impact the hydrogen density of the hydrogen-storage material formulation. Because the liquid electrolyte typically occupies space within powder of the hydrogen-storage material, there is usually a negligible volumetric change due to the presence of the liquid electrolyte.

Electrolytes are known to facilitate the kinetics of battery reactions. Batteries function electrochemically and inherently require electrolytes and an external electrical circuit to separate electron and ion flow. The present invention is predicated, in part, on the recognition that electrolytes may be applied to thermochemical hydrogen storage reactions, but without external applied voltage or current.

Hydrogen-storage materials have been described that function electrochemically. U.S. Pat. No. 8,764,966 to Vajo et al. (hereby incorporated by reference) describes an electrochemical process (not a thermochemical process) for hydrogen generation and storage that comprises two electrodes, an electrolyte, and application of a voltage between electrodes. The Vajo et al. patent formulates hydrogen-storage reactions as electrochemical reactions that can be driven by an electrical potential.

The use of solvents in hydrogen exchange reactions of hydrogen-storage materials has been reported. However, these solvent-based reactions do not contain electrolytes. In Zhang et al., "Understanding the effect of titanium species on the decomposition of alanates in homogeneous solution" *Journal of Alloys and Compounds* 413 (2006) 218-221, the dehydrogenation of $NaAlH_4$ and $LiAlH_4$ is described in homogeneous solutions of pure tetraglyme (tetraethylene glycol dimethyl ether). In this work the tetraglyme is a solvent, not an electrolyte, and the $NaAlH_4$ or $LiAlH_4$ homogeneously dissolve. Similarly, in Zheng et al., "Dehydrogenation of $LiAlH_4$ in HMPA" *International Journal of Hydrogen Energy* 33 (2008) 3346-3350, the dehydrogenation of $LiAlH_4$ in HMPA (hexamethylphosphoramide) is described. The $LiAlH_4$ is again homogeneously dissolved in the HMPA, which does not contain an electrolyte. In addition, it was found that the HMPA formed a complex with the dissolved Li. Thus this solvent, in addition to not being an electrolyte, acted as a reactant for the dehydrogenation reaction.

Many candidate hydrogen-storage materials with high capacities and thermodynamics appropriate for proton exchange membrane (PEM) fuel cells contain multiple solid phases that must nucleate, grow, and be consumed as hydrogen is released and stored. The presence of multiple solid phases in these materials hinders the kinetics of the solid-phase transformations that occur as hydrogen is exchanged, because solid-solid reactions can only occur where particles of different phases are in intimate physical contact. This physical contact is difficult given the typical irregularity of powder particles at the atomic scale. Overall, this requirement limits the rate at which hydrogen can be released and stored. As a result, most hydrogen-storage materials with multiple solid phases are not practical for commercial use, unless utilized according to the principles of the present invention, i.e. in combination with liquid electrolytes.

An example is the silicon-destabilized magnesium hydride chemical system. This hydrogen-storage material is based on magnesium hydride, $MgH_2$. Pure $MgH_2$ contains 0.076 grams of hydrogen per gram of $MgH_2$, or equivalently 7.6 weight percent hydrogen, typically written as 7.6 wt %. The hydrogen content is high, making $MgH_2$ potentially attractive for use with PEM fuel cells. See Vajo et al., "Altering Hydrogen Storage Properties by Hydride Destabilization through Alloy Formation: LiH and $MgH_2$ Destabilized with Si" *J. Phys. Chem B*, 108 (2004), 13977-83, which is hereby incorporated by reference herein.

Unfortunately, the thermodynamic properties of $MgH_2$ are problematic. Specifically, the enthalpy of formation ($\Delta H$) of $MgH_2$ is $-74.5$ kJ/mol-$H_2$ and the entropy of formation ($\Delta S$) is $-135$ J/K-mol-$H_2$. These values give a thermodynamic temperature $T_{1bar}$ for an equilibrium hydrogen pressure of 1 bar of 280° C., using $T_{1bar}=\Delta H/\Delta S$. This thermodynamic temperature is too high for transportation applications. However, the thermodynamic properties of $MgH_2$ can be tuned by using silicon as a destabilizing additive. Magnesium hydride and silicon react according to the reaction $2MgH_2+Si \leftrightarrow Mg_2Si+2H_2$, a reaction system that contains 5.0 wt % hydrogen and has $T_{1bar} \approx 15°$ C. Although lower than for pure $MgH_2$ (7.6 wt % hydrogen), the 5.0 wt % hydrogen content is still useful for PEM fuel cell applications, while the thermodynamic properties ($T_{1bar}$ close to room temperature) are nearly optimal. However, for the $MgH_2$/Si reaction to proceed, Mg metal produced by the dehydrogenation of $MgH_2$ must react with Si to form $Mg_2Si$. This normally requires atomic-scale contact between the $MgH_2$ and Si solid phases, which is difficult to achieve. As a result, effectively no reaction occurs between MgH2 and Si at 15° C. In fact, for typical formulations, reaction only begins to occur at about 270° C., which is characterized as a kinetic temperature $T_K$ (defined below). This difference between the thermodynamic temperature ($T_{1bar} \approx 15°$ C.) and the practical kinetic temperature ($T_K \approx 270°$ C.) illustrates the kinetic limitation in the $MgH_2$/Si system, since $T_K \gg T_{1bar}$. Thus, heretofore, $MgH_2$/Si is not a practical-hydrogen storage material.

Using $T_K$, a kinetic limitation can be defined in terms of an excess kinetic free energy ($\Delta G_K$) using the expression $\Delta G_K=(T_K-T_{1bar}) \cdot \Delta S$. $\Delta G_K$ is related to the activation energy of reaction, but it is not exactly the same since the activation energy is the energy barrier between strictly reactants and strictly products. $T_K$ is a temperature that represents a practical rate of dehydrogenation, i.e. a temperature at or above which there is significant formation of products (including $H_2$).

$T_K$ is not a true thermodynamic property but is a useful phenomenological parameter to characterize the observed kinetic limitations of a reaction system. In this specification, the "kinetic temperature" ($T_K$) is defined as the minimum temperature at which hydrogen gas is experimentally observed to be released from a hydrogen-storage material, at atmospheric pressure, as temperature is ramped up starting from room temperature (e.g., about 25° C.) to an arbitrary final temperature (e.g., about 200° C., 300° C., 400° C., 500° C., or more). "Experimentally observed" hydrogen release means that a practically measurable rate of $H_2$ gas evolution is detected, using ordinary analytical equipment such as gas chromatography, mass spectroscopy, nuclear magnetic resonance, or a combination thereof. For present purposes, a practically measurable rate of $H_2$ gas evolution is at least 0.01 wt % $H_2$ per hour, on the basis of hydrogen-storage material contained in the hydrogen-storage material formulation. In some embodiments, $T_K$ is defined as the temperature at which a rate of at least 0.05 wt % $H_2$ per hour, 0.1 wt % $H_2$ per hour, or 0.5 wt % $H_2$ per hour is measured.

Alternatively, $T_K$ may be defined according to a predetermined derivative of detected hydrogen volume with time, or a predetermined derivative of measured reaction pressure with time. Because the temperature-time correlation is generally known (according to a predetermined temperature ramp or based on temperature monitoring), $T_K$ may alternatively be defined according to a predetermined derivative of detected hydrogen volume with reaction temperature, or a predetermined derivative of measured reaction pressure with reaction temperature.

Klebanoff et al., "5 Years of hydrogen storage research in the U.S. DOE Metal Hydride Center of Excellence (MHCoE)" *Int. J. Hydrogen Energy*, 38 (2013), 4533-4576, is hereby incorporated by reference for all its disclosure including its teachings of $T_K$ in some embodiments of this specification.

At equilibrium or equivalently under thermodynamic control, the free energy change of a reaction is zero. Thus $\Delta G_K$ represents the free energy required to drive a kinetically hindered reaction, in excess of the thermodynamic driving force. The values above give $\Delta G_K$=34 kJ/mol-$H_2$ for the $MgH_2$/Si system. Considerable effort has been devoted to lowering $T_K$ and $\Delta G_K$ for the $MgH_2$/Si system. Using catalysts and nanoscale particles to increase interfacial area, $T_K$=200° C. with $\Delta G_K$=24 kJ/mol-$H_2$ has been achieved (see Polanski et al., "The influence of different additives on the solid-state reaction of magnesium hydride ($MgH_2$) with Si" *Int. J. Hyd. Ener.* 34 (2009), 7692-7699). Although improved, these values are still too high for commercial applications.

Other hydrogen-storage materials display similar excess kinetic free energies $\Delta G_K$. For example, the hydrogen-storage reaction system 2 $LiBH_4$+$MgH_2$↔2 LiH+$MgB_2$+$2H_2$ contains 11.4 wt % hydrogen and has a calculated $T_{1bar}$=170° C. This temperature was calculated from experimental enthalpies and entropies for each component. Experimentally, it is observed that $T_K$=380° C. Thus, $\Delta G_K$=22 kJ/mol-$H_2$. Another example is $Mg(BH_4)_2$, which has 14.8 wt % hydrogen and dehydrogenates according to the reaction $Mg(BH_4)_2$↔$MgB_2$+4 $H_2$. Experimentally, it is observed that $T_K$=250° C. From first-principles density functional theory (DFT) calculations for this reaction, $T_{1bar}$ is estimated to be 75° C. and $\Delta G_K$ is estimated to be 20 kJ/mol-$H_2$. These examples are further evidence that dehydrogenation reactions across solid-solid interfaces are kinetically limited and typically require at least 20 kJ/mol-$H_2$ of excess kinetic free energy to initiate the reaction.

In contrast to the extremely poor kinetics of the multi-component hydrogen-storage reactions described above, similar multi-component battery reactions (known as "alloy" and "conversion" reactions in the battery research community) can operate at or near room temperature (see Palacin, "Recent advances in rechargeable battery materials: a chemist's perspective" *Chem. Soc. Rev.*, 38 (2009), 2565-2575). Examples from battery systems include Li/$SnO_2$, which forms $Li_2O$ irreversibly and $Li_xSn$ (x=0.4-4.4) alloys reversibly; Li/$FeF_2$, which reversibly forms LiF and Fe; and Mg/Sn (Singh et al., "A high energy-density tin anode for rechargeable magnesium-ion batteries" *Chem. Comm.*, 49 (2013), 149-151), which reversibly forms $Mg_2Sn$.

To illustrate quantitatively the difference between a battery reaction and a hydrogen-storage reaction, the free-energy driving forces ($\Delta G$) can be compared for the Mg/Sn battery reaction and the $MgH_2$/Si hydrogen-storage reaction. Discharge of a Mg/Sn battery given by the reaction Mg+0.5 Sn→0.5 $Mg_2Sn$ is exothermic with a free energy $\Delta G$=−34.5 kJ (equivalent to 0.18 V) at room temperature. Reference is made to FIG. 1, adapted from Singh et al., "A high energy-density tin anode for rechargeable magnesium-ion batteries" *Chem. Comm.*, 49 (2013), 149-151, which is hereby incorporated by reference herein. In FIG. 1, voltage is plotted versus specific capacity for a Mg (anode)+Sn (cathode) battery at room temperature. A discharge curve 110 is shown, with $E_{discharge}$=0.155 V. The recharge curve 120 is shown, with $E_{recharge}$=0.20 V. The horizontal line 130 at 0.18 V represents the equilibrium voltage for this reaction (Mg+0.5 Sn↔0.5 $Mg_2Sn$).

Complete reaction between Mg and Sn has been observed at room temperature in a battery with an electrolyte appropriate for Mg (as shown in FIG. 1). The reverse endothermic recharging reaction ($\Delta G$=+34.5 kJ) was also observed at room temperature by applying a 0.20 V voltage equivalent to a free energy of −38.5 kJ, also in the presence of the electrolyte, thus driving the reaction with an overall net free energy of −4 kJ (=+34.5 kJ intrinsic plus −38.5 kJ externally applied). Thus, in the battery environment, an endothermic reaction was driven at room temperature by making the net free energy slightly negative (−4 kJ), made possible by electrochemical application of voltage between electrodes that are separated by an electrolyte.

The hydrogen-storage reaction chemistry of Mg reacting with Sn and Si is similar. For example, the analogous battery reaction Mg+0.5 Si→0.5 $Mg_2Si$ has $\Delta G$=−37.5 kJ. The reaction rates (activation energies) are much different for the analogous hydrogen-storage reaction, $MgH_2$+0.5 Si→0.5 $Mg_2Si$+$H_2$, where endothermic dehydrogenation is observed at temperatures of at least 200° C., at which temperature the free energy is −25 kJ. A comparison of these analogous reactions reveals that $\Delta G$=−4 kJ is sufficient to drive the battery reaction electrochemically, while $\Delta G$=−25 kJ is needed to drive the hydrogen-storage reaction thermochemically. Furthermore, despite being exothermic, the reverse hydrogenation reaction has not been observed even under 1850 bar $H_2$, which is equivalent to a free energy of about ~20 kJ at room temperature (see Paskevicius et al., "Kinetic limitations in the Mg—Si—H system" *Int. J. Hydrogen Energy*, 36 (2011), 10779-10786).

Figure 2:
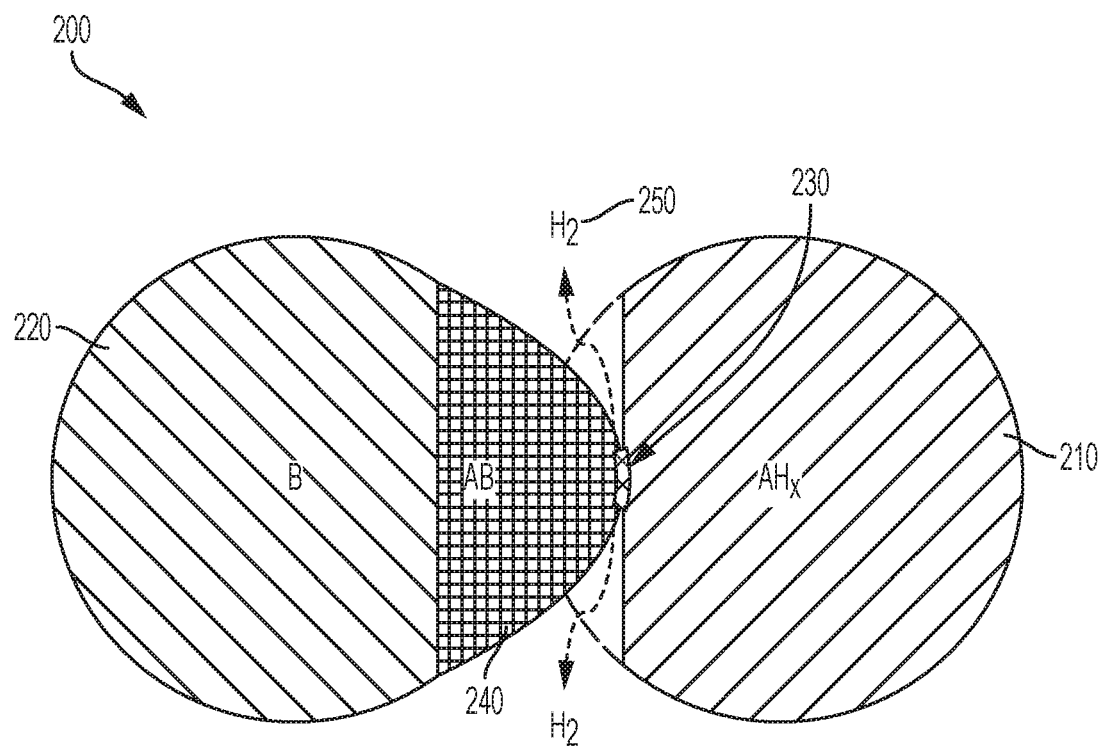
FIG. 2 is a schematic representing a typical dehydrogenation reaction when a liquid electrolyte is not employed.

Multi-component hydrogen-storage reactions (e.g., employing complex or destabilized metal hydrides) are restricted by a small solid-solid interfacial area, as illustrated in FIG. 2, for at least one reaction direction (hydrogenation or dehydrogenation). The long-range atomic transport necessary to complete these reactions (e.g., A moving into B) is slow and often requires high activation energy. In batteries, the electrochemically active species is solubilized in a liquid solvent as an ion (e.g., as a cation $Mg^{2+}$ for the Mg/Sn example).

FIG. 2 is a schematic representing a typical dehydrogenation reaction when a liquid electrolyte is not employed. A two-component ($AH_x$ and B) reaction 200 undergoes dehydrogenation $AH_x$+B→AB+x/2$H_2$ (0<x≤4 or more) conventionally, with reaction rate and transport rate limited by a small solid-solid interfacial surface area 230. An exemplary $AH_x$ particle 210 reacts with a B particle 220, at interfacial surface area 230, to form product AB in region 240. This reaction also generates hydrogen 250 that evolves from the small interfacial surface area 230.

Figure 3:
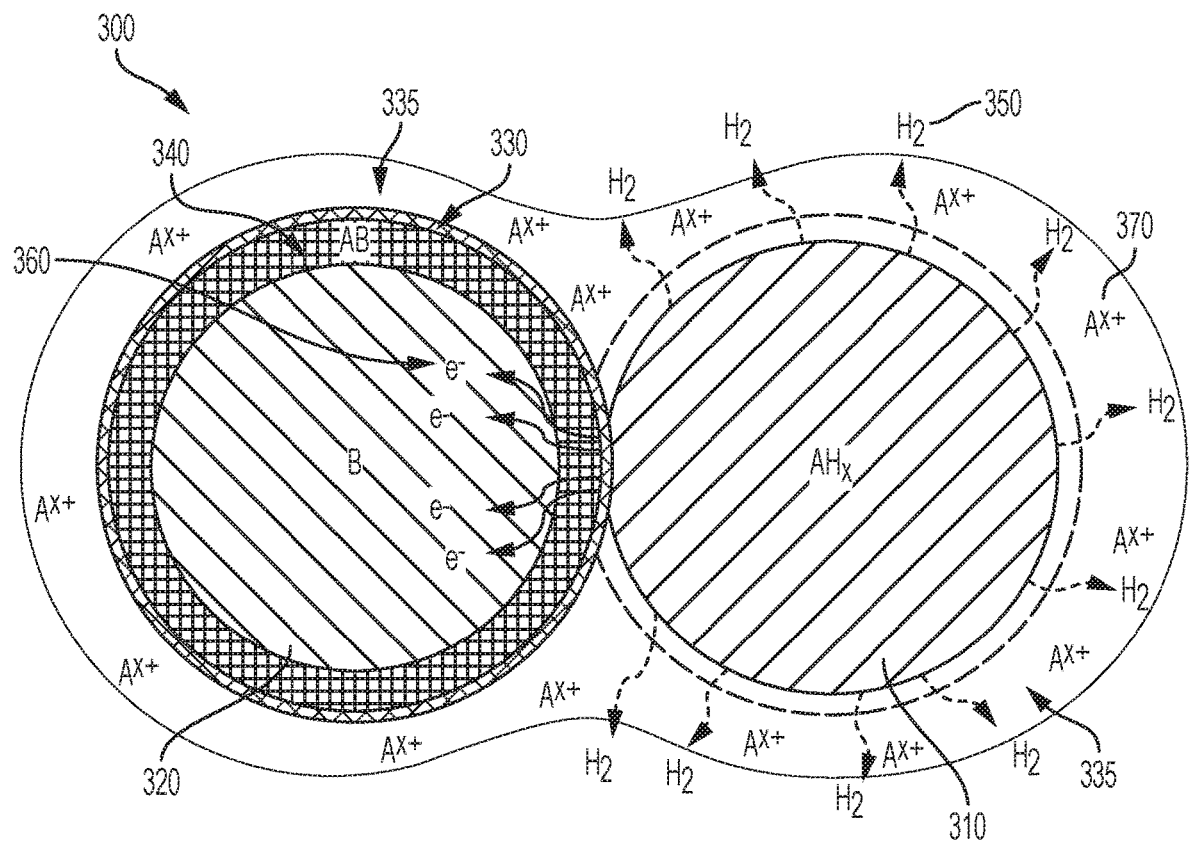
FIG. 3 is a schematic representing a dehydrogenation reaction when a liquid electrolyte is employed, in some embodiments of the invention.

By contrast, the presence of a liquid electrolyte facilitates transport between different components and enables the direct, atomic scale contact between reacting species over the full surface area of the solid phase (e.g. Sn), as illustrated in FIG. 3. The excess energy required to drive multi-component hydrogen-storage reactions may be significantly reduced using a liquid electrolyte, thereby lowering the necessary reaction temperature, to significantly improve the transport rates of the various species involved in the reaction.

FIG. 3 is a schematic representing a dehydrogenation reaction when a liquid electrolyte is employed, i.e. an electrolyte-assisted hydrogen storage reaction. A two-component ($AH_x$ and B) reaction 300 is exposed to a liquid electrolyte 335 to facilitate transport. The reaction occurs over the large solid-liquid surface area 330 surrounding the AB solid phase 340. Hydrogen 350 is released from $AH_x$ 310 via the reaction $AH_x \rightarrow A^{x+} + xe^- + x/2 H_2$ and $A^{x+}$ cations 370 react with B 320 and electrons ($e^-$) 360 to form AB 340 according to $A^{x+} + xe^- + B \rightarrow AB$ ($0 < x \leq 4$ or more). The liquid electrolyte 335 can solvate the $A^{x+}$ cations 370, facilitating transport and enabling reaction to occur over the full surface area 330 exposed to the electrolyte 335. Note that the dotted line around $AH_x$ 310 indicates the original volume of the $AH_x$ particle, prior to reaction, in this schematic. Electron 360 transport is still through solid (not through the liquid electrolyte), but faster compared to electron transport in FIG. 2. Optionally, electrically conductive additives may be included in $AH_x$ 310 and/or B 320.

Many types of hydrogen-storage materials may be employed within the hydrogen-storage material formulations of the present invention. The hydrogen-storage material is either a solid material at 25° C. and 1 atmosphere, or is a material that contains at least one solid phase at 25° C. and 1 atmosphere. Typically, the hydrogen-storage material is a solid material at an operation temperature (as described above, e.g. up to about 300° C.), or is a material that contains at least one solid phase at an operation temperature.

In various embodiments, the hydrogen-storage material includes one or more hydrides of Mg, Mn, Li, Al, K, Na, B, V, Ti, Cr, La, Ni, or combinations thereof. As intended herein, a "hydride" means that hydrogen is bonded to a metal, metal alloy, or metalloid. The type of hydrogen bonding may be ionic, covalent, interstitial (e.g., intercalated H atoms), or a combination thereof. The hydrogen-storage material preferably contains at least 1 wt %, 2 wt %, 3 wt %, 4 wt %, 5 wt %, 6 wt %, 7 wt %, 8 wt %, 9 wt %, or 10 wt % hydrogen.

The hydrogen-storage material may be selected from the group consisting of complex metal hydrides, destabilized metal hydrides, metal borohydrides, and combinations thereof, for example. In certain embodiments, the hydrogen-storage material is selected from the group consisting of $MgH_2$, $Mg(BH_4)_2$, $LiH$, $LiBH_4$, $LiAlH_4$, $KBH_4$, $NaAlH_4$, and combinations thereof.

In preferred embodiments, the hydrogen-storage material does not comprise or does not consist essentially of hydride complexes of the transition metals. For example, preferred hydrogen-storage materials are not selected from the class of compounds which contain hydrogen bound to a transition metal and other stabilizing ligands in a discrete molecular or ionic species. Examples of such transition-metal hydride complexes include $H_2Fe(PF_3)_4$ and $H_2Os(CO)_4$.

In preferred embodiments, the hydrogen-storage material does not comprise or does not consist essentially of complex hydride solvates. For example, preferred hydrogen-storage materials are not selected from the class of compounds which contain solvent molecule(s) coordinated to a complex hydride. Examples of such complex hydride solvates include lithium aluminum hydride dioxanate and calcium borohydride tetrahydrofuranate.

Magnesium hydride ($MgH_2$) is known to have a very high energy-storage density. One formulation containing $MgH_2$ can be found in Lu et al., "Hydrogen storage properties of nanosized $MgH_2$-$0.1TiH_2$ prepared by ultrahigh-energy-high-pressure milling," *Journal of the American Chemical Society*, 131 15843-15852 (2009), which is hereby incorporated by reference herein. Some variations utilize nanosized $MgH_2$-$0.1TiH_2$ prepared by ultrahigh-energy-high-pressure milling, for example.

Catalysts or other additives may be present in the hydrogen-storage material formulation. A catalyst may be included to catalyze the dehydrogenation reaction, for example. In some embodiments, a catalyst is a Ti-containing catalyst selected from the group consisting of Ti, $TiH_2$, TiAl, $Ti_3Al$, TiNi, TiFe, TiNb, $TiMn_2$, TiVMn, and combinations thereof. In certain embodiments, the catalyst is selected from the group consisting of $TiH_2$, TiAl, $TiMn_2$, and combinations thereof. The catalyst may be present in the hydrogen-storage material formulation from about 0.01 wt % to about 10 wt %, for example. In some embodiments, electrically conductive additives are included in the hydrogen-storage material formulation. Electrically conductive additives include metals and carbon, for example, and may be present in the hydrogen-storage material formulation from about 0.01 wt % to about 10 wt %, for example.

The concentration of the hydrogen-storage material in the overall hydrogen-storage material formulation may be from about 10 wt % to about 99 wt %, such as from about 25 wt % to about 80 wt %, or from about 50 wt % to about 90 wt %, for example. The remainder of the hydrogen-storage material formulation is the liquid electrolyte along with any optional additives, catalysts, or other materials.

Other variations of the invention provide a reversible hydrogen-storage material system, the system comprising:
(a) a solid hydrogen-storage material; and
(b) a liquid electrolyte that is ionically conductive for at least one ion derived from the hydrogen-storage material,
wherein the hydrogen-storage material, in a first state, contains at least one hydrogenated metal with hydrogen that is bonded ionically, covalently, and/or interstitially, and
wherein the hydrogen-storage material, in a second state, contains a dehydrogenated metal form of the hydrogenated metal(s).

The reversible hydrogen-storage material system is capable of at least 1 dehydrogenation-hydrogenation cycle, and preferably at least 2, 5, 10, or more dehydrogenation-hydrogenation cycles. A "cycle" means that in dehydrogenation, at least 0.1 wt %, 0.5 wt %, 1 wt %, 2 wt %, 3 wt %, 4 wt %, or 5 wt % hydrogen (on a hydrogen-storage material basis) is released from the hydrogenated metal and that in hydrogenation, at least 10%, 25%, 50%, 75%, or 99% (e.g., essentially all) of the amount of hydrogen that was released from the hydrogenated metal is added back in hydrogenation of the dehydrogenated metal form, to reversibly generate the hydrogenated metal.

Typically the hydrogen added in hydrogenation is not the same actual hydrogen released during dehydrogenation, which hydrogen is normally consumed to produce energy or otherwise used or stored. The hydrogen for hydrogenation can be provided from any source, such as (but not limited to) water electrolysis, syngas from steam reforming of methane, syngas from gasification of a carbonaceous feedstock, etc.

The reversible hydrogen-storage material system may be operable at a reaction temperature from about 0° C. to about 300° C., and at a reaction pressure from about 0.01 atm to about 100 atm. The reaction pressure may be the equilibrium pressure at the corresponding reaction temperature. In certain embodiments, the reaction pressure is higher than the equilibrium pressure at the corresponding reaction temperature, such as when a diluent is included. In certain embodiments, the reaction pressure is lower than the equilibrium pressure at the corresponding reaction temperature, such as when a vacuum is employed to capture hydrogen.

The reversible hydrogen-storage material system may employ a batch reactor, a continuous reactor, a semi-continuous reactor, or multiple reactors in batch, continuous, or semi-continuous mode.

In the reversible hydrogen-storage material system, the liquid electrolyte may be present in a liquid electrolyte concentration from about 1 wt % to about 50 wt %, and preferably less than 20 wt %, on the basis of combined weight of the hydrogen-storage material and the liquid electrolyte.

In the reversible hydrogen-storage material system, the hydrogen-storage material may be selected from the group consisting of complex metal hydrides, destabilized metal hydrides, metal borohydrides, and combinations thereof. The hydrogen-storage material preferably contains at least 3 wt % hydrogen.

A reversible hydrogen-storage material system may also contain various conduits (e.g. pipes or tubes), valves, pumps, heat exchangers, computers or other programmable elements, temperature probes, and other instrumentation. U.S. Pat. No. 9,777,968 (Vajo et al.) issued Oct. 3, 2017 is hereby incorporated by reference herein for its teachings including various systems that may be employed in some embodiments.

For example, a hydrogen conduit may be included, in the form of a pipe, tube, or other means of transporting hydrogen gas reversibly from one region to another region. Typically the hydrogen conduit will include a valve and/or other means to regulate gas flow rate and pressure. Heat exchangers may be configured to transport heat or cold to a heat-transfer medium, such as air, water, or another fluid. A hydrogen storage container (with connections to/from the hydrogen conduit) is optional. Other elements may include one or more pumps or compressors, one or more pressure regulators, temperature and pressure probes, and so on.

Metal hydrides discharge (evolve) hydrogen when the material is heated and uptake (absorb) hydrogen when the material is cooled. Thus, metals that absorb hydrogen will release heat when hydrogen is filled under pressure. Hydrogen is released when the pressure is reduced and heat is supplied. For example, upon heating up of $MgH_2$ in a closed system the compound will dissociate giving Mg and $H_2$ and the hydrogen pressure above the remaining $MgH_2$ will increase exponentially following the van't Hoff law.

The pressure within the system, or within one of the containers or regions, may vary over time. Each metal hydride will have an equilibrium pressure-temperature relationship. In various embodiments, for example, the pressure may vary from about 0.01 atm to about 100 atm. Pressure may be adjusted in the hydrogen conduit or in a hydrogen storage unit, for example, to increase or decrease $H_2$ pressure. In some embodiments, a hydrogen storage unit is used, along with a compressor and/or vacuum, to aid in regulating $H_2$ pressure.

In some embodiments, $H_2$ is obtained at pressure of at least about 5 atm for compatibility with fuel-cell systems which are commonly operated at elevated pressure. Higher $H_2$ pressures may be desirable, such as at least about 10 atm, 15 atm, 20 atm, 25 atm, or 30 atm, when downstream uses require higher $H_2$ pressures, or for storage convenience, for example. A hydrogen pressure sensor or flow sensor may be utilized in the system, and reaction conditions may be controlled to maintain a desired $H_2$ pressure.

A method of reversible hydrogen storage may include operating the disclosed reversible hydrogen-storage material system to dehydrogenate the hydrogen-storage material, at a dehydrogenation temperature from about 0° C. to about 300° C., and a dehydrogenation pressure from about 0.01 atm to about 10 atm, for example. The method may further comprise hydrogenating the hydrogen-depleted material at a later time and/or in another region of a system, at a hydrogenation temperature from about 0° C. to about 300° C., and a hydrogenation pressure from about 1 atm to about 100 atm, for example. The method may be carried out in at least 1 dehydrogenation-hydrogenation cycle, such as about 10 dehydrogenation-hydrogenation cycles, or more.

EXAMPLE

The $MgH_2$/Si reaction, $MgH_2+0.5\ Si \rightarrow 0.5\ Mg_2Si+H_2$, is used to demonstrate the effect of a liquid electrolyte on a multi-component hydrogen-storage reaction employing a destabilized metal hydride.

The liquid electrolyte for this Example is a LiI—KI—CsI ternary eutectic salt with equimolar (1:1:1) composition. The LiI—KI—CsI salt is pre-melted to form the eutectic salt from a mixture of the constituents (LiI, KI, and CsI), forming a solid salt. The solid salt is crushed to a powder for combining with the $MgH_2$/Si powder in the second sample described below. The salt powder has a melting point of 200-210° C. at 1 atm, meeting the definition of liquid electrolyte set forth in this patent application. The liquid electrolyte melting point is also less than the operation temperature of 250° C. utilized in this Example, fulfilling the requirement that the liquid electrolyte is in a liquid phase during operation.

First, $MgH_2$ is ball-milled with Si at a molar ratio of 2:1 $MgH_2$:Si for 5 hours using a planetary mill. Second, the milled $MgH_2$/Si powder is separated into two samples. The first sample is not combined with any liquid electrolyte. A second sample is combined with the selected liquid electrolyte to form an exemplary hydrogen-storage material formulation.

A conventional Sieverts system is used to measure the rate of hydrogen evolution from the two samples, without and with a liquid electrolyte. The reaction temperature is ramped up from about room temperature to 300° C., and desorbed hydrogen is measured, as experimentally summarized in FIG. 4.

Figure 4:
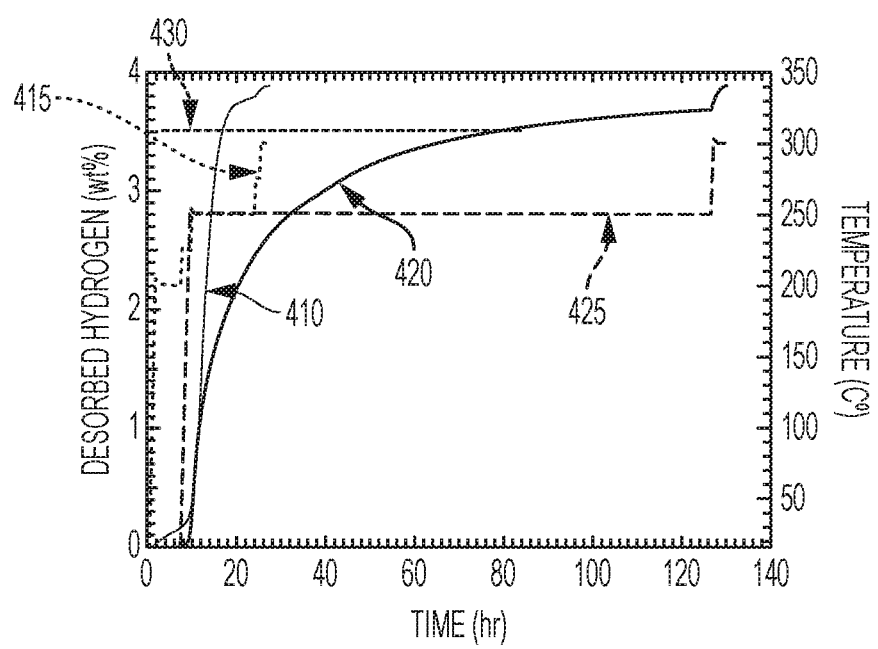
FIG. 4 shows thermal desorption of $H_2$ from $MgH_2$+0.5 Si with and without liquid electrolyte, in the Example herein.

FIG. 4 shows the thermal desorption of $H_2$ from $MgH_2$+ 0.5 Si with the liquid electrolyte (410) and without the liquid electrolyte (420). The dashed line 415 represents the temperatures (right axis) for the experiment 410 with liquid electrolyte. The dashed line 425 represents the temperatures (right axis) for the experiment 420 without liquid electrolyte. The dotted line 430 is a guide that represents 3.5 wt % desorbed $H_2$, to aid in comparison of the two samples.

The first sample (no electrolyte) is thermally decomposed at 250° C. and is observed to desorb about 3.5 wt % hydrogen over 70 hours (assuming the evolved gas to be all hydrogen), as shown in FIG. 4. By contrast, the second sample (in the presence of the LiI—KI—CsI liquid electrolyte) is observed to release ~3.5 wt % hydrogen over 7 hours at 250° C.

There is a 10× increase in $H_2$ evolution rate in the presence of a liquid electrolyte, compared to an otherwise-equivalent exemplary hydrogen-storage material formulation that does not contain a liquid electrolyte. This order-of-magnitude of improvement is surprising and proves that the liquid electrolyte enhances the rate of hydrogen evolution ($H_2$ release during dehydrogenation).

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A hydrogen-storage material formulation comprising:
   (a) a solid hydrogen-storage material containing at least one metal and hydrogen that is bonded ionically, covalently, and/or interstitially within said hydrogen-storage material; and
   (b) a liquid electrolyte that is ionically conductive for at least one ion derived from said hydrogen-storage material, wherein said liquid electrolyte is compositionally different than said hydrogen-storage material,
   wherein said liquid electrolyte is selected such that said liquid electrolyte is characterized by the property that at a temperature equal to the melting point of said liquid electrolyte, said liquid electrolyte does not react with said hydrogen-storage material to release said hydrogen,
   wherein said hydrogen-storage material is in the form of a powder, and wherein said liquid electrolyte occupies space within said powder.

2. The hydrogen-storage material formulation of claim 1, wherein said liquid electrolyte is present in a liquid electrolyte concentration from about 1 wt % to about 50 wt % of said hydrogen-storage material formulation.

3. The hydrogen-storage material formulation of claim 2, wherein said liquid electrolyte concentration is less than 20 wt % of said hydrogen-storage material formulation.

4. The hydrogen-storage material formulation of claim 1, wherein said hydrogen is bonded ionically, covalently, and/or interstitially with said at least one metal.

5. The hydrogen-storage material formulation of claim 1, wherein said hydrogen-storage material further contains a metalloid, and wherein said hydrogen is bonded ionically and/or covalently with said metalloid.

6. The hydrogen-storage material formulation of claim 1, wherein said hydrogen-storage material is selected from the group consisting of complex metal hydrides, destabilized metal hydrides, metal borohydrides, and combinations thereof.

7. The hydrogen-storage material formulation of claim 1, wherein said hydrogen-storage material consists of a material selected from the group consisting of $MgH_2$, $Mg(BH_4)_2$, $LiH$, $LiBH_4$, $LiAlH_4$, $KBH_4$, $NaAlH_4$, and combinations thereof.

8. The hydrogen-storage material formulation of claim 1, wherein said hydrogen-storage material contains at least 3 wt % hydrogen.

9. The hydrogen-storage material formulation of claim 8, wherein said hydrogen-storage material contains at least 5 wt % hydrogen.

10. The hydrogen-storage material formulation of claim 1, wherein said liquid electrolyte has an ionic conductivity at 25° C. of at least $10^{-6}$ S/cm for said at least one ion derived from said hydrogen-storage material.

11. The hydrogen-storage material formulation of claim 10, wherein said liquid electrolyte has an ionic conductivity at 25° C. of at least $10^{-3}$ S/cm for said at least one ion derived from said hydrogen-storage material.

12. The hydrogen-storage material formulation of claim 1, wherein said liquid electrolyte is characterized by the property that at a temperature equal to the melting point of said liquid electrolyte, said liquid electrolyte does not react with said hydrogen.

13. The hydrogen-storage material formulation of claim 1, wherein said liquid electrolyte is a non-aqueous liquid electrolyte.

14. The hydrogen-storage material formulation of claim 1, wherein said liquid electrolyte comprises a solvent and one or more dissolved salts.

15. The hydrogen-storage material formulation of claim 1, wherein said liquid electrolyte comprises a molten salt.

16. The hydrogen-storage material formulation of claim 15, wherein said molten salt comprises one or more halogenated alkali metals.

17. The hydrogen-storage material formulation of claim 15, wherein said liquid electrolyte further comprises one or more additional dissolved salts.

18. The hydrogen-storage material formulation of claim 1, wherein said liquid electrolyte is ionically conductive for one or more cations selected from the group consisting of $Li^+$, $Mg^{2+}$, $Na^+$, $K^+$, and $Ca^{2+}$.

19. The hydrogen-storage material formulation of claim 1, wherein said liquid electrolyte is ionically conductive for one or more anions selected from the group consisting of $H^-$, $BH_4^-$, $AlH_4^-$, and $(AlH_6)^{3-}$.

20. The hydrogen-storage material formulation of claim 1, wherein said liquid electrolyte contains halogen anions.

21. The hydrogen-storage material formulation of claim 1, wherein said hydrogen-storage material is characterized by a higher hydrogen evolution rate in the presence of said liquid electrolyte compared to an otherwise-equivalent hydrogen-storage material formulation without said liquid electrolyte, as determined by a Sieverts system utilized to measure the rate of said hydrogen evolution with a temperature ramp from 20° C. to 300° C. over a period of 72 hours.

22. A reversible hydrogen-storage material system, said system comprising:
   (a) a solid hydrogen-storage material; and
   (b) a liquid electrolyte that is ionically conductive for at least one ion derived from said hydrogen-storage material, wherein said liquid electrolyte is compositionally different than said hydrogen-storage material, wherein said hydrogen-storage material, in a first state, contains at least one metal and hydrogen that is bonded ionically, covalently, and/or interstitially within said hydrogen-storage material, wherein said hydrogen-storage material, in a second state, contains a dehydrogenated form of said hydrogen-storage material, wherein said liquid electrolyte is selected such that said liquid electrolyte is characterized by the property that at a temperature equal to the melting point of said liquid electrolyte, said liquid electrolyte does not react with said hydrogen-storage material to release said hydrogen, wherein said hydrogen-storage material is in the form of a powder, and wherein said liquid electrolyte occupies space within said powder.

23. The reversible hydrogen-storage material system of claim 22, wherein said liquid electrolyte is present in a liquid electrolyte concentration from about 1 wt % to about 50 wt % on the basis of combined weight of said hydrogen-storage material and said liquid electrolyte.

24. The reversible hydrogen-storage material system of claim 22, wherein said hydrogen-storage material is selected from the group consisting of complex metal hydrides, destabilized metal hydrides, metal borohydrides, and combinations thereof.

25. The reversible hydrogen-storage material system of claim 22, wherein said hydrogen-storage material contains at least 3 wt % hydrogen.

26. The reversible hydrogen-storage material system of claim 22, wherein said liquid electrolyte is characterized by the property that at a temperature equal to the melting point of said liquid electrolyte, said liquid electrolyte does not react with said hydrogen.

* * * * *